US008658221B2

(12) United States Patent
Baeuerlein et al.

(10) Patent No.: US 8,658,221 B2
(45) Date of Patent: Feb. 25, 2014

(54) EXTRACTION PROCESS FOR PLANT INGREDIENTS

(75) Inventors: Michael Baeuerlein, Berlin (DE); Joseph Miller, St. Charles, IL (US)

(73) Assignee: Bayer Cropscience AG, Monheim (DE)

( * ) Notice: Subject to any disclaimer, the term of this patent is extended or adjusted under 35 U.S.C. 154(b) by 0 days.

(21) Appl. No.: 12/808,610

(22) PCT Filed: Dec. 16, 2008

(86) PCT No.: PCT/EP2008/011100
§ 371 (c)(1),
(2), (4) Date: Jun. 16, 2010

(87) PCT Pub. No.: WO2009/077207
PCT Pub. Date: Jun. 25, 2009

(65) Prior Publication Data
US 2010/0305313 A1     Dec. 2, 2010

Related U.S. Application Data

(60) Provisional application No. 61/007,937, filed on Dec. 17, 2007.

(30) Foreign Application Priority Data

Dec. 17, 2007 (EP) ..................... 07123407

(51) Int. Cl.
*A61K 36/00*     (2006.01)
(52) U.S. Cl.
USPC ......................................................... 424/725
(58) Field of Classification Search
None
See application file for complete search history.

(56) References Cited

U.S. PATENT DOCUMENTS

| | | | | |
|---|---|---|---|---|
| 4,285,735 A | | 8/1981 | Mitchell et al. | |
| 4,613,377 A | * | 9/1986 | Yamazaki et al. | 127/39 |
| 4,871,574 A | * | 10/1989 | Yamazaki et al. | 426/622 |
| 5,478,732 A | | 12/1995 | Kunz et al. | |
| 2004/0176647 A1 | | 9/2004 | Perdices et al. | |

FOREIGN PATENT DOCUMENTS

| | | | |
|---|---|---|---|
| CN | 1422547 A | * | 6/2003 |
| DE | 3603678 A1 | | 8/1987 |
| EP | 0 627 490 A1 | | 12/1994 |
| EP | 0 787 745 A2 | | 8/1997 |
| EP | 0 792 646 A1 | | 9/1997 |
| JP | 2006-199651 | | 8/2006 |
| WO | WO 00/11967 | | 3/2000 |
| WO | WO 2007/128559 A2 | | 11/2007 |
| WO | WO 2009/077207 A2 | | 6/2009 |

OTHER PUBLICATIONS

"Marijuana: Stem Tea (Twig Tea)". Web publication date: Dec. 2, 2001 [Retrieved from the Internet on: Jan. 17, 2012]. Retrieved from the Internet: <URL: http://www.marijuana.com/cooking-marijuana-recipes/2826-stem-tea-twig-tea.html>.*
"5 Minute Microwave Artichokes!". Web Date: Aug. 18, 2005 [Retrieved from the Internet on: Jan. 18, 2012]. Retrieved from the Internet: <URL: http://vegweb.com/index.php?topic=11212.0>.*
Willaman, JJ. "The Preparation of Inulin, with special reference to artichoke tubers as a source". Journal of Biological Chemistry (Dec. 6, 1921), pp. 275-283.*
Falbe, "Katalysatoren, Tenside and Mineralöladditive" (Catalysts, Surfactants and Mineral Oil Additives), Thieme Verlag, Stuttgart, (1978), pp. 123-217.
Falbe, "Surfactants in Consumer Products", Springer Verlag, Berlin, (1987), pp. 54-124.
Anonymous: "How to brew coffee—National Coffee Association," Internet Article, [Online], Oct. 15, 2007; (Retrieved from internet: URL:http://web.archive.org/web/20071015143239/http://ncausa.org/i4a/pages/index.cfm?pageid=71>, XP002533949.
Lopez-Molina, D. et al.: "Molecular properties and prebiotic effect of inulin obtained from artichoke (*Cynara scolymus* L.)," Phytochemistry, Pergamon Press, GB, vol. 66, No. 12, Jun. 1, 2005, pp. 1476-1484, XP004967684.
Second Office Action for Chinese Patent Application 200880119841.7, mailed Mar. 1, 2013 (10 pages).
Wang, Qi-wei et al., "Study on Technology of Extracting Inulin from Halianthus Tuber," Abstract, College of Chemistry and Chemical Engineering, Ningxia University, Yinchuan, China 750001, vol. 1, No. 2, Sep. 2002.

* cited by examiner

*Primary Examiner* — Amy L Clark
(74) *Attorney, Agent, or Firm* — Hunton Williams LLP

(57) ABSTRACT

The present invention relates to a process for the extraction of plant ingredients, which comprises a) comminuting plant material b) adding a solvent to the comminuted plant material c) subjecting the mixture of comminuted plant material and solvent to an ultrahigh temperature treatment at 95-150° C. over a period of 5-300 seconds.

62 Claims, No Drawings

EXTRACTION PROCESS FOR PLANT INGREDIENTS

CROSS-REFERENCE TO RELATED APPLICATIONS

This application is the U.S. National Stage filing of International Patent Application No. PCT/EP2008/011100, filed Dec. 16, 2008, which claims priority to EP 07123407.4, filed Dec. 17, 2007, and U.S. Provisional Patent Application No. 61/007,937, filed Dec. 17, 2007, the disclosures of each are hereby incorporated by reference in their entirety.

FIELD OF INVENTION

The present invention relates to a process for the extraction of plant ingredients which is carried out over a short period.

BACKGROUND

Current processes for the extraction of plant ingredients are predominantly undertaken according to the cocurrent principle or countercurrent principle. For example, EP627490 describes the countercurrent extraction of inulin from chicory roots.

EP792646 relates to cosmetic or pharmaceutical compositions for the skin which can be obtained by means of countercurrent extraction from an extract of *Solanum lycocarpum*.

In DE3603678, a combination of expression and extraction in a multistage process is carried out. Here, in the first stage, undried alkaloid plant pieces are expressed using a suitable press and the resulting pomace is extracted countercurrently in a two-stage process with water.

Current cocurrent and countercurrent extraction processes require relatively long periods. It was therefore an object of the present invention to provide an improved, in particular time-saving, extraction process for plant ingredients.

There are other processes for extraction of plant ingredients which do not use the cocurrent or countercurrent principle. Often, these processes are time consuming and/or use relatively high temperatures, which leads to a higher energy consumption:

EP-A 0787745 discloses an extraction of Jerusalem artichoke tubers wherein ground tubers are transferred to boiling water and extracted for 10-15 minutes.

US2004176647 discloses a process to extract phenolic compounds from a residual plant material using a hydrothermal treatment. The hydrothermal treatment is based on placing the crude residual plant material in contact with hot water in a closed reactor, comprising the following steps: a) placing the material to be treated in contact with water in a closed reactor, b) stirring; c) heating to a temperature between 180 and 240° C., and at a pressure so that the water is maintained in liquid phase; d) constantly stirring the mixture for a time period between 4 and 30 minutes; and e) cooling the reactor to approximately 40° C., unloading the mixture, filtering and recovering the liquid fraction.

JP-A 2006199651 describes the extraction of fibroplast growth factor 5 inhibitor from specific plants, wherein plant material a comminuted and extracted with 50% ethanol at 82° C. for 10 minutes.

SUMMARY OF THE PREFERRED EMBODIMENTS OF THE INVENTION

The present invention relates to a process for the extraction of plant ingredients, which comprises a) comminuting plant material
b) adding a solvent to the comminuted plant material
c) subjecting the mixture of comminuted plant material and solvent to an ultrahigh temperature treatment at 95-150° C. over a period of 5-300 seconds.

DETAILED DESCRIPTION OF THE PREFERRED EMBODIMENTS OF THE INVENTION

The extraction according to the invention by means of ultrahigh temperature treatment is advantageous because it is a process which is completed in a very short time. An extraction in the countercurrent process using a heat exchange device requires a period of at least 30-40 minutes, but usually 90 minutes or more.

The term "ultrahigh temperature" in the present invention means a temperature of at least 95° C. In specific embodiments of the present invention, the term "ultrahigh temperature" can also mean a temperature of at least 100° C. or at least 110° C.

As a result of the short extraction time of the process according to the invention, fewer oxidation and degradation processes on the desired plant ingredients take place, as a result of which the yield is increased and by-products are avoided.

Furthermore, as a result of the very short extraction time, fewer colorations arise due to oxidation of plant phenols that are often present which adversely affect the end product and have to be removed.

The ultrahigh temperature treatment is carried out at temperatures of at least 95° C., as a result of which plant ingredients are transferred from the plant material into the solvent and at the same time enzymes and microorganisms are deactivated. In this embodiment, the advantage of the process according to the invention is that the extraction of the desired ingredients and the deactivation of enzymes and microorganisms take place in one step after the plant raw material has been comminuted. An ultrahigh temperature (UHT) treatment has hitherto been used only for the deactivation of microorganisms, mostly in a subsequent process stage, and not for the deactivation of enzymes and extraction of plant ingredients from the plant raw material. The deactivation of enzymes occurs by denaturation. Denaturation in an early process stage is advantageous since enzymes which can degrade the desired plant ingredients are rendered harmless.

Another benefit of the present invention is that the ultrahigh temperature treatment is carried out at 95-150° C. Other processes for extraction of plant ingredients use higher temperatures which is more energy consuming.

Finally, it has been found that, in the process according to the invention, fewer chemicals are required for adjusting the pH of the extraction mixture than in the case of conventional countercurrent processes. It has been found that in a conventional countercurrent process, the fluctuations in the pH are greater and regularly have to be evened out by adding chemicals. This is probably due to the release of polyphenols and their oxidation. The extraction mixture in the process according to the invention is comparatively pH-stable.

For the purposes of this invention, the term "plant material" refers to all parts of a plant which comprise the desired plant ingredients. Particular preference is given to fruits, flowers, seeds, tubers, leaves, stalks, barks, roots or stems, or a mixture thereof.

Comminution of the plant material can take place using all devices known to the person skilled in the art. Mention may be made, for example, of shredders, choppers, (cutting) mills, dicers. The comminution should take place at the lowest possible temperature of the material and of the machines in order to avoid oxidation and degradation, preferably at <10° C. Comminution can take place in several stages, from coarse to fine. Following completion of the comminution, a particle size must be present which permits handling of a mixture of the comminuted plant material and the solvent in a UHT process.

Suitable solvents are all those which are known as extraction solvents for plant ingredients. A preferred solvent is water for the extraction of at least partially water-soluble ingredients. Water is safe for subsequent food applications, is available at low cost and non-flammable. In order to achieve better extraction yields, it may be advantageous to add a nonpolar cosolvent to the water. A preferred cosolvent is alcohol, such as, for example, ethanol, propanol, isopropanol. If the substance to be extracted is to be used as a food, ethanol is most preferred. Addition preferably takes place in an amount of up to 18 volume percent of the cosolvent, based on the total solvent mixture.

Depending on the system (plant, ingredient to be extracted), it is also possible to add a surfactant in order to promote extraction of the plant ingredient and stabilization of the plant ingredient in the liquid phase. This is the case particularly in the case of nonpolar ingredients, such as, for example, terpenes. Suitable surfactants are anionic surfactants, nonionic surfactants or cationic surfactants.

Examples of anionic surfactants are soaps, alkylbenzenesulfonates, alkanesulfonates, olefinsulfonates, alkyl ether sulfonates, glycerol ether sulfonates, alpha-methyl ester sulfonates, sulfo fatty acids, alkyl sulfates, fatty alcohol ether sulfates, glycerol ether sulfates, fatty acid ether sulfates, hydroxy mixed ether sulfates, monoglyceride (ether) sulfates, fatty acid amide (ether) sulfates, mono- and dialkyl sulfosuccinates, mono- and dialkyl sulfosuccinamates, sulfotriglycerides, amide soaps, ether carboxylic acids and salts thereof, fatty acid isothionates, fatty acid sarcosinates, fatty acid taurides, N-acylamino acids, such as, for example, acyl lactylates, acyl tartrates, acyl glutamates and acyl aspartates, alkyl oligoglucoside sulfates, protein fatty acid condensates (in particular wheat-based plant products) and alkyl (ether) phosphates.

Typical examples of nonionic surfactants are fatty alcohol polyglycol ethers, alkylphenol polyglycol ethers, fatty acid polyglycol esters, fatty acid amidepolyglycol ethers, fatty aminepolyglycol ethers, alkoxylated triglycerides, mixed ethers and mixed formals, optionally partially oxidized alk(en)yl oligoglycosides and glucoronic acid derivatives, fatty acid N-alkylglucamides, proteinhydrolysates, polyol fatty acid esters, sugar esters, sorbitan esters, polysorbates and amine oxides.

Typical examples of cationic surfactants are quaternary ammonium compounds, such as, for example, dimethyldistearylammonium chloride, and ester quats, in particular quaternized fatty acid trialkanolamines ester salts. Typical examples of amphoteric and zwitterionic surfactants are alkylbetaines, alkylamidobetaines, aminopropionates, aminoglycinates, imidazolinium betaines and sulfobetaines.

The specified surfactants are exclusively known compounds. With regard to structure and preparation of these substances, reference is made to relevant review works, for example J. Falbe (ed.), "Surfactants in Consumer Products", Springer Verlag, Berlin, 1987, pp. 54-124, or J. Falbe (ed.), "Katalysatoren, Tenside and Mineralöladditive" [Catalysts, surfactants and mineral oil additives], Thieme Verlag, Stuttgart, 1978, pp. 123-217.

Depending on the system (type of plant, type of ingredient) and depending on the heat-exchange device used, the ratio of plant material to solvent is to be set so as to allow adequate flow through the device.

The solvent can be added during the comminution or after it or directly prior to the ultrahigh temperature treatment, whatever the person skilled in the art decides depending on the pregiven system.

In a further embodiment of the present process, the UHT treatment period is 5-200 seconds, preferably 5-150 seconds, more preferably 5-100 seconds, even more preferably 5-60 seconds, especially preferably 5-50 seconds or 10-50 seconds, still more preferably 5-30 seconds or even 10-30 seconds, and most preferably 5-25 seconds or even 10-25 seconds.

The UHT treatment is undertaken in a special embodiment of the invention at a temperature of 100-150° C., more preferably at 110° C.-150° C. In another embodiment, the UHT treatment is undertaken at a temperature of 95-140° C., preferably 100-140° C. and most preferably 110-140° C. In still another embodiment, the UHT treatment is undertaken at a temperature of 95-130° C., preferably 100-130° C. and most preferably 110-130° C. Each of these temperature ranges can be combined with each of the time periods specified above.

In a further embodiment of the invention, the ultrahigh temperature treatment is undertaken indirectly through a heat-exchange device. In the indirect UHT process, a heat-exchange medium, such as, for example, water or steam, does not come into direct contact with the extraction mixture of comminuted plant material and solvent. The heat-exchange device is preferably a plate heat exchanger or a tubular heat exchanger. However, it is also possible to use other heat-exchange devices known to the person skilled in the art. Serving as separation surfaces are plates in the case of plate heat exchangers, and tube bundles in the case of tubular heat exchangers. The abovementioned temperatures and time periods of the UHT treatment are used. In the case of indirect UHT treatment, UHT treatment time period is to be understood as meaning the residence time of the mixture of comminuted plant material and solvent at the maximum UHT treatment temperature. The total residence time of the mixture in the heat-exchange device is usually longer since, for example, in the case of a tubular heat exchanger, the maximum temperature is not immediately reached or is no longer reached at the entry and exit, respectively.

In a special embodiment of the present invention the ultrahigh temperature treatment is undertaken in a countercurrent process when a heat-exchange device is used. This embodiment is very beneficial since known processes require much longer periods of time than in the present invention, usually 90 minutes or more.

In another embodiment of the invention the ultrahigh temperature treatment can be undertaken in a cocurrent process in a heat-exchange device.

In a further embodiment of the invention, the ultrahigh temperature treatment takes place through direct steam introduction. In this process, steam is introduced under pressure directly into the extraction mixture of comminuted plant material and solvent. The above-mentioned temperatures and time periods of the UHT treatment can likewise be used. The UHT treatment time period corresponds in the method of direct steam introduction to the steam introduction time period.

After the UHT treatment, the mixture of comminuted plant material and solvent can be stirred at a lower temperature in order to continue the extraction and to increase the yield of desired ingredient. However, this step is entirely optional and not mandatory for the success of the process according to the invention.

After extraction has taken place, the solid plant material can be separated from the liquid phase. For this, any device known to the person skilled in the art can be used, such as, for example, decanters, centrifuges, filtration devices, membranes etc. After the liquid phase has been separated off, solvent can again be added to the solid plant material and a UHT treatment carried out, as described above. However, this step is purely optional and is not mandatory for the success of the process according to the invention.

Isolation and purification of the desired plant ingredient from the liquid phase can take place by customary methods, such as, for example, precipitation, membrane separation, evaporation etc. The product can also be freed from colored impurities using known methods, e.g. by treatment with activated carbon, chromatography, precipitation, recrystallization or a combination thereof.

In one embodiment of the process according to the invention, the plant ingredient is inulin, in particular long-chain inulin. Inulin can be extracted using the process according to the invention from, for example, chicory (*Cichorium intybus*), dahlias (*Dahlia*), Jerusalem artichoke (*Helianthus tuberosus*) or plants of the genus *Cynara*, as Globe artichokes (*Cynara scolymus/Cynara cardunculus* L.) and Cardoon (*Cynara cardunculus* L.). Plants of the genus *Cynara* are hereinafter designated as "artichoke". The inulin is preferably a long-chain inulin which is extracted from artichoke roots. This long-chain inulin from artichoke roots has a weight-average of the degree of polymerization DPw of greater than 40, determined using GPC-RI. 162 g/mol is used as molecular weight of a monomer in calculations. In connection with the present invention, the term "inulin" is intended to be understood as meaning a polyfructane which consists of a beta-2-1-linked chain of fructose molecules. This chain may carry a reducing alpha-D-glucose unit at its end.

The artichoke roots used for the extraction of inulin should be freed from any adhering impurities before the comminution, e.g. by intensive washing with water using a high-pressure cleaner. The washing can take place in the frozen state of the roots in order to keep the mass loss of root material as low as possible. If necessary, the roots are firstly coarsely precomminuted, e.g. by chopping. For the further comminution, shredders or cutting mills are preferred, a Rotoplex 28/40 cutting mill from Hosokawa/Alpine having proven particularly useful. The product obtained is comminuted root material in the form of mostly fibrous pieces. In a particularly preferred embodiment of the invention, the artichoke roots are comminuted into pieces and pureed before the ultrahigh temperature treatment. Prior pureeing permits very rapid extraction coupled with high yield and good handling of the root/solvent mixture in the UHT device, in particular in a tubular heat exchanger. The pureeing can take place in customary devices, with a Rietz-Desintegrator RA-12 from Hosokawa having proven particularly advantageous. The pureeing of the artichoke roots preferably takes place at a temperature of <10° C., preferably <5° C., with the addition of water, very particularly preferably in ice-water. As a result of processing at a low temperature, oxidation and degradation processes of the plant material are largely or even completely avoided. The amount of water is adjusted so that a flowable puree is obtained which can be handled easily in a UHT device, in particular in a tubular heat exchanger. The water/root weight ratio is in one embodiment in the range from 3/1-7/1, preferably 4/1-6/1.

In a special embodiment of the present invention, when inulin is the plant ingredient, the ultrahigh temperature treatment is undertaken in a countercurrent process in a heat-exchange device.

After the UHT treatment, the mixture of artichoke roots and water can be stirred at a lower temperature in order to continue the extraction and to increase the yield of inulin. A UHT treatment at 110-150° C. over a period of 10-50 seconds is advantageous. A post extraction can then take place over a period of up to 15 minutes at 50-100° C. with stirring. However, the post extraction is purely optional and not mandatory for the success of the process according to the invention.

Further preferred plant ingredients which can be obtained using the process according to the invention are:
a) flavonoids and biflavonoids, such as, for example anthocyanidins, aurones, catechins, chalcones, deoxyanthocyanidins, flavanols, flavanones, flavones, isoflavons, flavonols, dihydroflavonols, leukoanthocyanidins, amentoflavones, proanthocyanidins,
b) curcuminoids, such as, for example, curcumin I [bis(feruloyl)methane], demethoxycurcumin [feruloyl-(4-cumaroyl)methane] and bisdemethoxycurcumin [Bis(4-cumaroyl)methane],
c) the constituents of cinnamon leaf oil and cinnamon bark oil, such as eugenol, linalool, cinnamaldehyde, safrol, eugenyl acetate, cinnamyl acetate and benzyl benzoate
d) terpenes, such as pinene, myrcene, camphor, terpinenes, terpineols, limonene, phellandrene, linalyl acetate, linalyl propanoate, caryophyllenes, carvone, cineols, geraniol or farnesol.

Further preferred plant ingredients are selected from the polyphenols, the tannins, the lignans, the anthocyans, proanthocyanidine, silymarin, silybin, silychristin, silydianin, taxifolin, anethole, cynarin and copaene.

The person skilled in the art is aware from which plants the above ingredients can be obtained without these plants having to be explicitly listed here. By way of example, mention may be made of turmeric, ginger, cinnamomum species (Lauraceae), anise, fennel, taxus, such as, for example, *Taxus Baccata* and catharanthus, e.g. *Catharanthus roseus*.

The invention is illustrated below by reference to examples, but these are not to be interpreted as being any restriction of the general inventive concept.

EXAMPLE 1

Extraction of Artichoke Roots with UHT in a Tubular Heat Exchanger

The starting material used was 173 kg of artichoke roots of the "Concerto" variety which were harvested in September 2007 in the Netherlands. The inulin content of the roots was 17.40% of the total mass (including water).

a) Comminution and Pureeing of the Roots

The roots were comminuted using a cutting mill 28/40 from Hosokawa/Alpine with the sieve of the apparatus removed. Water was then added to the root pieces (mass ratio water/roots=5/1) and the mixture was pureed using a Rietz-Desintegrator RA-12 from Hosokawa (mesh size of the sieve used: 1 mm).

b) UHT Treatment

An indirect UHT treatment of the root puree was undertaken in a tubular heat exchanger from HRS Spiratube. The treatment was carried out at 120° C. over a period of 27 seconds at a volume stream of 300 l/h.

After the UHT treatment, the solid was separated off from the liquid using an SDA 230 decanter from Westfalia. This gave 480 kg of aqueous inulin extract which comprised 13.5 kg of inulin with a weight-average of the degree of polymerization of 47 (GPC RI).

EXAMPLE 2

Extraction of Artichoke Roots with Direct Steam Introduction (DSI)

The starting material used was 114 kg of artichoke roots of the "Concerto" variety which were harvested in September 2007 in the Netherlands. The inulin content of the roots was 17.43% of the total mass (including water).

a) Comminution and Pureeing of the Roots

The roots were comminuted using a cutting mill 28/40 from Hosokawa/Alpine with the sieve of the apparatus removed. Water was then added to the root pieces (mass ratio water/roots=4/1) and the mixture was pureed using a Rietz-Desintegrator RA-12 from Hosokawa (mesh size of the sieve used: 1 mm).

b) UHT Treatment

The water/root mass ratio in the root puree was 4/1. Since the root puree was diluted as a result of the steam introduction, a waterroot ratio of 5/1 was ultimately obtained. Steam with a temperature of 120° C. was introduced into the puree over a period of 23 seconds and with a volume stream of 250-300 l/h. The amount of microorganisms in the sample was then determined by means of cell counting. Before the UHT treatment, a value of $10^6$ to $10^7$ colony-forming units (cfu/g) was ascertained, after the UHT treatment the value was <100 cfu/g, by which an inactivation of microorganisms was demonstrated.

After the UHT treatment, 0.5% by weight of magnesium sulfate and 1.0% by weight of calcium hydroxide were added to the paste in order to precipitate out colored constituents. The solid was then separated off from the liquid using an SDA 230 decanter from Westfalia. This gave 325 l of aqueous inulin extract which comprised 7.0 kg of inulin with a weight-average of the degree of polymerization of 44 (GPC RI).

The invention claimed is:

1. A method for isolating inulin from inulin-containing plant material comprising:
   a) comminuting the inulin-containing plant material to provide comminuted plant material;
   b) adding water or water and alcohol to the comminuted plant material to provide a mixture of comminuted plant material and solvent;
   c) subjecting the mixture of comminuted plant material and solvent to an ultrahigh temperature treatment at 95-150° C. over a period of 5-300 seconds to obtain a solid plant material and a liquid phase;
   d) separating the solid plant material from the liquid phase; and
   e) isolating the inulin from said liquid phase,
wherein said inulin-containing plant material is artichoke root or Jerusalem artichoke tuber.

2. The method of claim 1, wherein the ultrahigh temperature treatment is carried out at a temperature of 100-150° C.

3. The method of claim 1, wherein the ultrahigh temperature treatment is carried out over a period of 5-200 seconds.

4. The method of claim 1, wherein the ultrahigh temperature treatment is undertaken indirectly through a heat-exchange device.

5. The method of claim 4, wherein the ultrahigh temperature treatment is undertaken in a countercurrent process.

6. The method of claim 4, wherein the heat-exchange device is a tubular heat exchanger.

7. The method of claim 1, wherein the ultrahigh temperature treatment takes place through direct steam introduction.

8. The method of claim 1, wherein water is added in step b).

9. The method of claim 1, wherein the plant material is artichoke root.

10. The method of claim 9, wherein the artichoke root is comminuted into pieces and is pureed before the ultrahigh temperature treatment.

11. The method of claim 10, wherein the artichoke root is pureed at a temperature below 10° C. and with the addition of water.

12. The method of claim 1, wherein water and alcohol are added in step b).

13. The method of claim 12, wherein the alcohol is ethanol.

14. The method of claim 1, wherein the plant material is finely comminuted.

15. The method of claim 1, wherein the ultrahigh temperature treatment is carried out over a period of 5-150 seconds.

16. The method of claim 1, wherein the ultrahigh temperature treatment is carried out over a period of 5-100 seconds.

17. The method of claim 1, wherein the ultrahigh temperature treatment is carried out over a period of 5-50 seconds.

18. The method of claim 1, wherein the ultrahigh temperature treatment is carried out at 110-150° C.

19. The method of claim 1, the ultrahigh temperature treatment is carried out at 110- 150° C. over a period of 10-50 seconds.

20. The method of claim 1, wherein the plant material is Jerusalem artichoke tuber.

21. The method of claim 1, wherein said inulin is a long-chain inulin that has a weight-average of the degree of polymerization DPw of greater than 40 determined using GPC-RI.

22. The method of claim 11, wherein the root is pureed at a temperature below 5° C. and with the addition of water.

23. The method of claim 1, wherein the artichoke is a Globe artichoke.

24. The method of claim 1, wherein the artichoke is a Globe artichoke and the Globe artichoke root is comminuted into pieces and is pureed before the ultrahigh temperature treatment.

25. The method of claim 24, wherein the ultrahigh temperature treatment is carried out at 100-150° C. over a period of 5-50 seconds.

26. The method of claim 24, wherein the ultrahigh temperature treatment is carried out at 100-140° C. over a period of 5-50 seconds.

27. The method of claim 24, wherein the ultrahigh temperature treatment is carried out at 110-150° C. over a period of 5-50 seconds.

28. The method of claim 24, wherein the ultrahigh temperature treatment is carried out at 110-140° C. over a period of 5-50 seconds.

29. The method of claim 24, wherein the ultrahigh temperature treatment is carried out at 100-150° C. over a period of 5-100 seconds.

30. The method of claim 24, wherein the ultrahigh temperature treatment is carried out at 100-140° C. over a period of 5-100 seconds.

31. The method of claim 24, wherein the ultrahigh temperature treatment is carried out at 110-150° C. over a period of 5-100 seconds.

32. The method of claim 24, wherein the ultrahigh temperature treatment is carried out at 110-140° C. over a period of 5-100 seconds.

33. The method of claim 24, wherein the ultrahigh temperature treatment is carried out at 100-150° C. over a period of 5-200 seconds.

34. The method of claim 24, wherein the ultrahigh temperature treatment is carried out at 100-140° C. over a period of 5-200 seconds.

35. The method of claim 24, wherein the ultrahigh temperature treatment is carried out at 110-150° C. over a period of 5-200 seconds.

36. The method of claim 24, wherein the ultrahigh temperature treatment is carried out at 110-140° C. over a period of 5-200 seconds.

37. The method of claim 24, wherein said inulin is a long-chain inulin that has a weight-average of the degree of polymerization DPw of greater than 40 determined using GPC-RI.

38. The method of claim 37, wherein the ultrahigh temperature treatment is carried out at 100-150° C. over a period of 5-50 seconds.

39. The method of claim 37, wherein the ultrahigh temperature treatment is carried out at 100-140° C. over a period of 5-50 seconds.

40. The method of claim 37, wherein the ultrahigh temperature treatment is carried out at 110-150° C. over a period of 5-50 seconds.

41. The method of claim 37, wherein the ultrahigh temperature treatment is carried out at 110-140° C. over a period of 5-50 seconds.

42. The method of claim 37, wherein the ultrahigh temperature treatment is carried out at 100-150° C. over a period of 5-100 seconds.

43. The method of claim 37, wherein the ultrahigh temperature treatment is carried out at 100-140° C. over a period of 5-100 seconds.

44. The method of claim 37, wherein the ultrahigh temperature treatment is carried out at 110-150° C. over a period of 5-100 seconds.

45. The method of claim 37, wherein the ultrahigh temperature treatment is carried out at 110-140° C. over a period of 5-100 seconds.

46. The method of claim 37, wherein the ultrahigh temperature treatment is carried out at 100-150° C. over a period of 5-200 seconds.

47. The method of claim 37, wherein the ultrahigh temperature treatment is carried out at 100-140° C. over a period of 5-200 seconds.

48. The method of claim 37, wherein the ultrahigh temperature treatment is carried out at 110-150° C. over a period of 5-200 seconds.

49. The method of claim 37, wherein the ultrahigh temperature treatment is carried out at 110-140° C. over a period of 5-200 seconds.

50. The method of claim 24, wherein the root is pureed at a temperature below 10° C. and with the addition of water.

51. The method of claim 1, wherein the ultrahigh temperature treatment is carried out at 100-150° C. over a period of 5-50 seconds.

52. The method of claim 1, wherein the ultrahigh temperature treatment is carried out at 100-140° C. over a period of 5-50 seconds.

53. The method of claim 1, wherein the ultrahigh temperature treatment is carried out at 110-150° C. over a period of 5-50 seconds.

54. The method of claim 1, wherein the ultrahigh temperature treatment is carried out at 110-140° C. over a period of 5-50 seconds.

55. The method of claim 1, wherein the ultrahigh temperature treatment is carried out at 100-150° C. over a period of 5-100 seconds.

56. The method of claim 1, wherein the ultrahigh temperature treatment is carried out at 100-140° C. over a period of 5-100 seconds.

57. The method of claim 1, wherein the ultrahigh temperature treatment is carried out at 110-150° C. over a period of 5-100 seconds.

58. The method of claim 1, wherein the ultrahigh temperature treatment is carried out at 110-140° C. over a period of 5-100 seconds.

59. The method of claim 1, wherein the ultrahigh temperature treatment is carried out at 100-150° C. over a period of 5-200 seconds.

60. The method of claim 1, wherein the ultrahigh temperature treatment is carried out at 100-140° C. over a period of 5-200 seconds.

61. The method of claim 1, wherein the ultrahigh temperature treatment is carried out at 110-150° C. over a period of 5-200 seconds.

62. The method of claim 1, wherein the ultrahigh temperature treatment is carried out at 110-140° C. over a period of 5-200 seconds.

* * * * *

UNITED STATES PATENT AND TRADEMARK OFFICE
CERTIFICATE OF CORRECTION

PATENT NO. : 8,658,221 B2
APPLICATION NO. : 12/808610
DATED : February 25, 2014
INVENTOR(S) : Baeuerlein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 102 days.

Signed and Sealed this

Twenty-ninth Day of September, 2015

Michelle K. Lee
*Director of the United States Patent and Trademark Office*